United States Patent [19]

Butt

[11] Patent Number: 4,652,323

[45] Date of Patent: Mar. 24, 1987

[54] PLASMA DEPOSITION APPLICATIONS FOR COMMUNICATION CABLES

[75] Inventor: Sheldon H. Butt, Godfrey, Ill.

[73] Assignee: Olin Corporation, New Haven, Conn.

[21] Appl. No.: 569,376

[22] Filed: Jan. 9, 1984

[51] Int. Cl.$^4$ .............................................. H01B 13/32
[52] U.S. Cl. ........................................ 156/51; 156/294; 156/423; 350/96.23; 427/38; 427/118
[58] Field of Search ..................... 156/51, 294, 423; 350/96.23; 427/38, 118

[56] References Cited

U.S. PATENT DOCUMENTS

| | | |
|---|---|---|
| 4,110,137 | 8/1978 | Beach . |
| 4,113,349 | 9/1978 | Stiles . |
| 4,143,942 | 3/1979 | Anderson . |
| 4,166,670 | 9/1979 | Ramsay . |
| 4,195,906 | 4/1980 | Dean et al. . |
| 4,239,336 | 12/1980 | Parfree et al. . |
| 4,257,675 | 3/1981 | Nakagome et al. . |
| 4,275,262 | 6/1981 | Sellars . |
| 4,278,835 | 7/1981 | Jackson . |
| 4,333,706 | 6/1982 | Davis et al. . |
| 4,341,440 | 7/1982 | Trezeguet et al. . |
| 4,349,243 | 9/1982 | Amano et al. . |
| 4,361,381 | 11/1982 | Williams . |
| 4,371,234 | 2/1983 | Parfree et al. . |
| 4,372,792 | 2/1983 | Dey et al. . |

FOREIGN PATENT DOCUMENTS

| | | |
|---|---|---|
| 1438074 | 6/1976 | United Kingdom . |
| 1479427 | 7/1977 | United Kingdom . |
| 1480206 | 7/1977 | United Kingdom . |
| 1577323 | 10/1980 | United Kingdom . |
| 1583520 | 1/1981 | United Kingdom . |
| 1582851 | 1/1981 | United Kingdom . |
| 1583276 | 1/1981 | United Kingdom . |
| 1583383 | 1/1981 | United Kingdom . |
| 1584250 | 2/1981 | United Kingdom . |
| 1584457 | 2/1981 | United Kingdom . |
| 1592192 | 7/1981 | United Kingdom . |
| 1601003 | 10/1981 | United Kingdom . |
| 2085188A | 4/1982 | United Kingdom . |
| 2091903A | 8/1982 | United Kingdom . |
| 2101392A | 1/1983 | United Kingdom . |

*Primary Examiner*—Robert A. Dawson
*Attorney, Agent, or Firm*—Barry L. Kelmachter; Howard M. Cohn; Paul Weinstein

[57] ABSTRACT

The present invention is directed to a communication cable having improved adhesion between metallic and non-metallic layers. The cable has a metallic core structure in which at least one optical fiber and/or electrical conductor is housed, at least one external layer fabricated from a non-metallic material and an adherent, plasma deposited polymeric film coating between the core structure and an external layer for improving the adhesion between the core structure and the external layer. A process and apparatus for fabricating the communication cable are also described.

17 Claims, 6 Drawing Figures

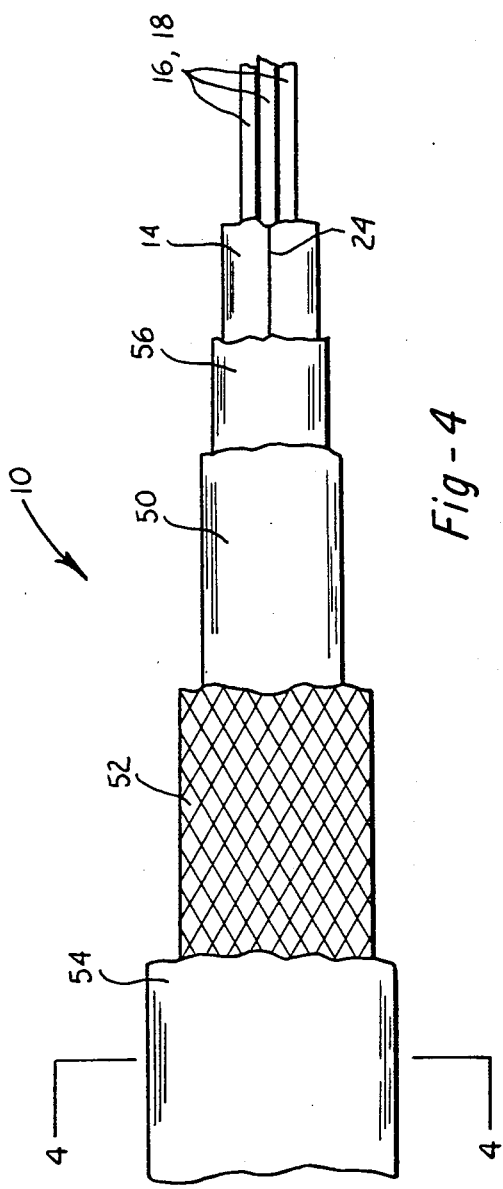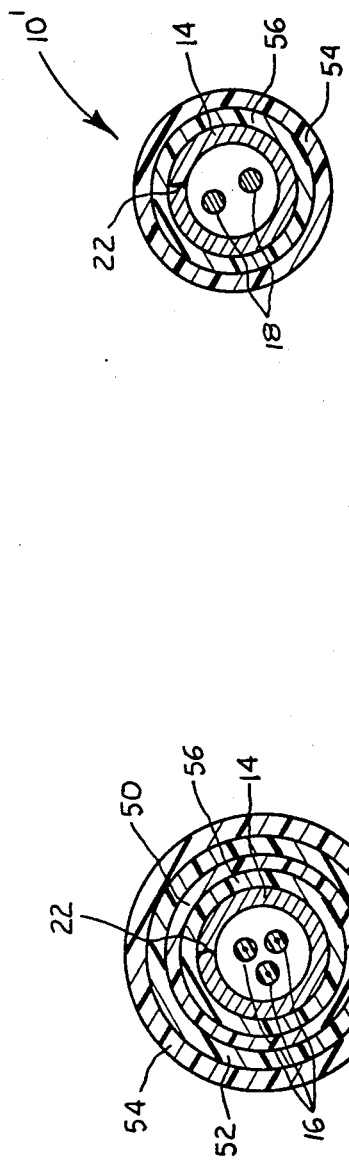

PLASMA DEPOSITION APPLICATIONS FOR COMMUNICATION CABLES

This application is related to Ser. No. 554,465, filed Nov. 22, 1983 for a ONE-STEP PLASMA TREATMENT OF COPPER FOILS TO INCREASE THEIR LAMINATE ADHESION, now U.S. Pat. No. 4,526,806 and Ser. No. 554,466, filed Nov. 22, 1983 for a THREE-STEP PLASMA TREATMENT OF COPPER FOILS TO ENHANCE THEIR LAMINATE ADHESION, now U.S. Pat. No. 4,524,089. This application is also related to Ser. No. 413,846, filed Sept. 1, 1982 for METHOD AND APPARATUS FOR ASSEMBLING AN OPTICAL FIBER COMMUNICATION CABLE, now U.S. Pat. No. 4,508,423; Ser. No. 395,443, filed July 6, 1982 for METHOD AND APPARATUS FOR ASSEMBLING AN COMPACT MULTI-CONDUCTOR OPTICAL FIBER COMMUNICATION CABLE, now U.S. Pat. No. 4,479,702; Ser. No. 497,535, filed May 24, 1983 for PROCESS AND APPARATUS FOR FABRICATING OPTICAL FIBER CABLES, now U.S. Pat. No. 4,555,054; Ser. No. 497,533, filed May 24, 1983 for OPTICAL FIBER COMMUNICATION CABLES AND METHOD AND APPARATUS FOR ASSEMBLING SAME: Ser. No. 497,546, filed May 24, 1983 for METHOD AND APPARATUS FOR ASSEMBLING AN OPTICAL FIBER COMMUNICATION CABLE; and Ser. No. 497,522, filed May 24, 1983 for PROCESS AND APPARATUS FOR FABRICATING TUBULAR STRUCTURES.

This application is directed to a process and apparatus for forming a communication cable having improved adhesion between layers.

Communication cables containing optical fibers and/or electrical conductors are used in a wide variety of applications. As a result, the construction of a particular cable is often dependent upon its intended use. For many applications, it is necessary to protect the optical fibers and/or electrical conductors by housing them within a metal or metal alloy sheath. Depending upon the environment in which the cable is to be placed, this protective sheath may be surrounded by one or more layers of metallic and/or non-metallic material. For example, in those applications where the sheath functions as an electrical conductor as well as a protective member, it may be surrounded by a layer of dielectric material. In those applications where the cable is to be placed in a submarine environment or in an environment containing moisture, the sheath may be surrounded by a non-metallic layer such as a layer of high density polyethylene. U.S. Pat. Nos. 4,143,942 to Anderson, 4,239,336 to Parfree et al., 4,257,675 to Nakagome et al., 4,275,262 to Sellars, 4,278,835 to Jackson, 4,333,706 to Davis et al., 4,341,440 to Trezeguet et al., 4,349,243 to Amano et al., 4,361,381 to Williams, 4,371,234 to Parfree et al. and 4,372,792 to Dey et al. illustrate some of the communication cable constructions known in the art.

In some prior art cable constructions, particularly those where strength is important, a strength layer of metallic and/or non-metallic filaments coated with a synthetic plastic material have been fabricated about the optical fiber(s) itself and/or a protective sheath housing the fiber(s). U.S. Pat. No. 4,166,670 to Ramsay and U.K. Patent Specification No. 1,438,074 to Lewis illustrate such protective layers. In U.S. Pat. No. 4,113,349 to Stiles, a fiber reinforced, resin outer shell may be formed using a thermosetting polymer as a binding resin.

One of the chronic problems associated with the fabrication of communication cables having a metal protective sheath encased in one or more non-metallic layers is obtaining satisfactory adhesion between the metallic and non-metallic layers. For example, where metals such as copper and copper alloys are used to form the protective sheath, it is extremely difficult to bond the sheath to a wide variety of plastic materials. If adhesion is poor, the bond between the metallic sheath and the non-metallic layer or layers may fail and make it possible for the metal sheath and its components to move relative to the other layers when the communication cable is stretched or bent. This is highly undesirable because overall cable strength is significantly reduced.

Recognizing these problems, it has been suggested in the prior art to form the protective sheath from a metal or metal alloy having a layer of rubber or plastic material on at least one of its surfaces. It has been suggested that when an external body or layer of rubber or plastic material is extruded around the sheath, a firm bond would be achieved between the material of rubber or plastic layer on the metal or metal alloy and the surrounding non-metallic layer. U.S. Pat. Nos. 4,110,137 to Beach and 4,195,906 to Dean et al., U.K. Patent Specification No. 1,583,520 to Chapman and U.K. Patent Application No. 2,091,903A to Sadler et al. describe communication cable constructions having a protective sheath formed from a metal or metal alloy having a layer of plastic or rubber material.

Where the rubber or plastic layers are applied to the metal or metal alloy before the metal or metal alloy is fabricated into a tube, it is possible for the tube fabrication technique to peel or scratch the rubber or plastic layer. Were this to happen, the layer could lose its continuity and areas of poor adhesion may be created. In extreme situations, the rubber or plastic layer could be completely peeled or removed from the metal or metal alloy thereby defeating the purpose of applying the plastic or rubber layer in the first place. For example, were the coated metal or metal alloy to be pulled through a forming die, the die could peel or scratch the layer. In addition, where the rubber or plastic layer is applied to the metal or metal alloy long before the coated metal or metal alloy is fabricated into a communication cable, it is possible for the desirable properties of the layer to degrade. Degradation of the rubber or plastic layer could adversely affect its ability to be bonded to other plastic or rubber layers.

Recognizing the potential deficiencies of the techniques suggested by the prior art, the present invention sets out to substantially avoid them. In accordance with a first aspect of the present invention, a relatively thin layer of polymeric material is plasma deposited onto a surface of a metal or metal alloy sheath or containment tube housing one or more electrical conductors after the formation and just prior to the fabrication of one or more non-metallic surrounding layers. It has been found that plasma deposited polymeric films provide unusually good adhesion between a metal or metal alloy member and a non-metallic member.

In a preferred manner for performing the present invention, the plasma deposited polymeric film coating is applied in situ to the metal or metal alloy tube. By applying the polymeric film coating in situ, one can have a relatively fresh layer of material with good adhesive qualities ready to be bonded to a non-metallic layer subsequently fabricated thereover. In addition, by first depositing the polymeric film coating after the metal or metal alloy tube has been formed, it is possible to avoid damaging the coating during the tube forming process. As a result, the coating should be substantially continuous without any scratches or any peeled away sections.

In a preferred manner for fabricating a communication cable in accordance with the instant invention, a strip of metal or metal alloy such as copper or a copper alloy is pulled through at least one die to form a metallic tubular core member. During formation of this tubular member, at least one optical fiber and/or electrical conductor is inserted into the forming tube. After the tube forming operation has been completed, the polymeric film coating is deposited onto a surface of the tubular member by passing the tubular member through a chamber having a desired plasma. In a first approach, the plasma is formed from a monomer gas and, in an alternative approach, the plasma is formed from a polar containing organic species and at least one of nitrogen and hydrogen. After the polymeric film coating has been deposited onto the protective sheath or tubular core member, one or more non-metallic layers such as a high density polyethylene insulating layer may be fabricated about the tube and its polymeric film coating.

In another aspect of the present invention, a plurality of non-metallic filaments such as plastic filaments are wrapped about the metallic tube and/or about an intermediate non-metallic layer encasing the tube. Where it is desired to increase the strength of this layer and consequently increase the overall cable strength, a polymeric material is plasma deposited over the filaments. It is believed that this polymeric material will cause the filaments to be bonded together. Bonding the filaments together has the effect of both reducing the abrasive wear caused by movement of adjacent ones of the filaments and improving the resistance of the layer to penetration by foreign objects.

It is an object of the present invention to fabricate a communication cable having improved adhesion between its layers.

It is a further object of the present invention to provide a cable as above having improved adhesion between a metallic component and a non-metallic layer surrounding the metallic component.

It is still a further object of the present invention to provide a communication cable as above having an improved strength layer.

It is still a further object of the present invention to provide a process and apparatus for fabricating the above communication cable.

These and other objects will become more readily apparent from the following description and drawings in which like reference numerals designate like elements.

FIG. 4 is a schematic representation of a communication cable having various exposed parts.

FIG. 5 is a cross-sectional view taken along lines 4—4 of FIG. 4.

FIG. 6 is a cross-sectional view of an alternative communication cable construction.

Figure 1:
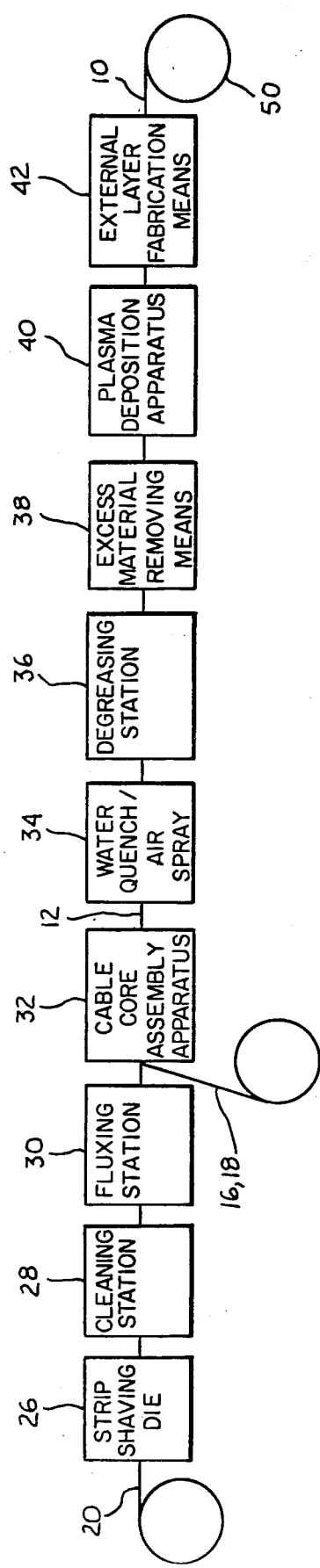
FIG. 1 is a schematic representation of an apparatus for fabricating a communication cable in accordance with the present invention.
Figure 2:
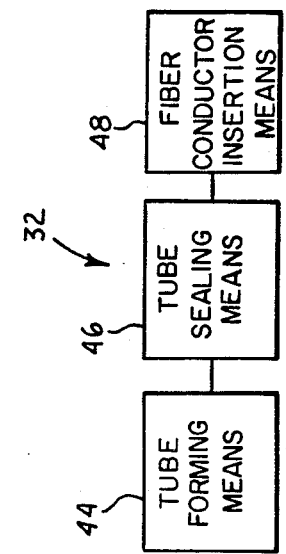
FIG. 2 is a schematic representation of the cable core assembly apparatus of FIG. 1.

In accordance with the present invention, a technique for forming a communication cable having improved adhesion between adjoining metallic and non-metallic layers is described. More particularly, the present invention comprises a communication cable having one or more optical fibers and/or electrical conductors housed in a containment tube having a plasma deposited polymeric film coating on its external surface. This polymeric film coating improves the adhesion between the metal or metal alloy containment tube and a subsequently fabricated external layer or layers. By improving the adhesion between the containment tube and the surrounding external layer or layers, overall cable strength can be improved by substantially eliminating relative movement between the containment tube and the surrounding external layer or layers.

Referring now to the Figures, an apparatus for fabricating a communication cable 10 in accordance with the present invention is illustrated. The cable 10 has a core assembly 12 generally comprising a containment tube 14 in which one or more optical fibers 16 and/or one or more electrical conductors 18 are housed. The containment tube 14 is preferably formed from a metal or metal alloy strip 20 using a die forming technique. The strip 20 may be a single length of material or a plurality of lengths joined together. If the strip 20 comprises a plurality of joined lengths, the lengths may be joined in any suitable manner. For example, conventional joining techniques such as brazing, soldering, welding and diffusion bonding may be used to bond the lengths together.

Tube 14 may be formed from any metal or metal alloy that exhibits a desired set of properties. The desired properties would of course depend upon the ultimate use for the tube and the cable. In fabricating containment tubes for communication cables, properties such as strength, formability and electrical conductivity are important. Since a die forming approach is preferably used to form the strip 20 into the tube 14, the strip 20 should also have sufficient hardness to permit using such an approach. Accordingly, the starting strip 20 should be work hardened to a hardness of at least about ¼ hard and preferably at least about full hard.

It has been found to be quite advantageous to form the tube 14 from a strip 20 having a transverse cross-sectional area that exceeds the desired transverse tube cross-sectional area by about 5% to about 20%, preferably by about 8% to about 17% and most preferably by about 10% to about 15%. By using such a strip, it is possible to place the edges 22 forming the tube seam 24 into significant compression during tube formation. This is desirable because the tube seam 24 tends to be more closed and easier to seal. It is also possible using the die forming approach described hereinafter to to deform the edges 22 into substantially non-linear intermeshing edges that assist in providing the tube 14 with improved hermeticity. These and other benefits are more fully described in U.S. patent application Ser. No. 497,535, filed May 24, 1983, to Winter et al., now U.S. Pat. No. 4,555,054, which is hereby incorporated by reference.

In performing the die forming approach described hereinafter, it is important for smooth operation of the die or dies to use a metal strip 20 having extremely close tolerance in width and substantially burr free edges. This can be a problem where the strip to be formed into the tube 14 comes from commercial strip that has been slit to a desired strip width. The two criteria, slit width and burr, are extremely difficult to achieve in normal production. Standard tolerances on slit strip are usually ±0.005 at best and burr is an inherent part of most slitting operations.

Referring now to FIG. 1, before being passed through the cable core assembly apparatus 32, the strip 20 is pulled through a shaving die 26 to remove excess width above a desired strip width and most, if not all, shearing burrs. Shaving die 26 may be any suitable shaving die known in the art. In a preferred embodiment, the shaving die 26 comprises a carbide insert not shown having a bore not shown shaped to shave anything outside a desired dimension. The insert is mounted in a holder not shown. This shaving die and its use is more fully described in the co-pending Ser. No. 497,535 application to Winter et al. which has been incorporated by reference.

After passing through the shaving die 26, the strip 20 may be passed to a cleaning station 28 to remove any contaminants or loose particles on the strip. The type of cleaning system used will depend upon the nature of the material forming the strip and the nature of the contaminants to be removed. Any suitable conventional cleaning system known in the art may be utilized.

After being cleaned, the strip 20 may be passed through a fluxing station 30. The fluxing station 30 may comprise any conventional means known in the art for applying any conventional flux to the edges 22. Since fluxing the strip edges 22 is not absolutely necessary to form the tube 14, fluxing station 30 may be omitted if desired.

After the preliminary operations have been completed, the strip 20 is fed into the cable core assembly apparatus 32. The cable core assembly generally comprises means 44 for forming the strip 20 into the tube 14, means 46 for sealing the tube 14 and means 48 for inserting one or more optical fibers 16 and/or one or more electrical conductors 18 into the tube 14. If needed, the fiber/conductor inserting means may also inject a filler material not shown into the tube 14. Generally, the optical fiber(s), the electrical conductor(s) and/or any filler material are deposited in the tube 14 after the tube seam 24 has been sealed.

As previously discussed, the strip 20 is preferably formed into the tube 14 using a die forming approach. In a preferred embodiment, the tube forming means 44 comprises a pair of forming dies not shown. The tube 14 is formed by drawing or pulling the strip 20 through a first die not shown where it is formed into an open tube section and then through a second die not shown wherein the open tube section is formed into a substantially closed tube. During passage through the second die, the strip edges take on the aforementioned substantially non-linear, intermeshing configuration and are placed into compression as a result of the excess volume of strip material.

The strip 20 may be drawn through the die or dies by any suitable means known in the art for applying a forward tensile force to the strip 20. For example, strip 20 may be connected to a take-up reel 50 by any suitable means not shown known in the art. If desired, an intermediate cable puller not shown may be used to assist in drawing the strip through the core assembly apparatus 32.

The manner in which the dies form the strip 20 into the tube 14 is more fully described in co-pending U.S. patent application Ser. No. 497,522 to Winter et al., filed May 24, 1983 which is hereby incorporated by reference. In lieu of the above-described two die technique, the tube 14 may be formed by a one-die technique such as that described in co-pending U.S. patent application Ser. No. 413,846, filed Sept. 1, 1982, now U.S. Pat. No. 4,508,423, to Winter et al. or by the two-die technique described in U.S. patent application Ser. No. 497,533, filed May 24, 1983 to Winter et al., which are both hereby incorporated by reference.

Where hermeticity is important, such as in underground and submarine environments, the tube 14 may be passed to a station 46 for sealing the seam. While sealing station 46 may comprise any conventional sealing apparatus for soldering, welding, brazing or applying any other suitable sealing technique, it is preferred to use a meniscus or wave soldering apparatus not shown. A suitable meniscus or wave soldering apparatus is described in co-pending U.S. patent application Ser. No. 497,535, filed May 24, 1983, to Winter et al., now U.S. Pat. No. 4,555,054, which is hereby incorporated by reference. If desired, the sealing apparatus could also comprise a hot dip apparatus in which the tube 14 is drawn through a molten solder bath not shown so as to completely coat the outer surface of the tube with a desired solder. Where hermeticity is not important, the tube sealing means 46 may be omitted.

In a preferred manner of assembling the cable core 12, the optical fiber(s) 16 and/or the electrical conductor(s) 18 are not deposited into the tube 14 by the insertion means 48 until the sealing operation has been completed. The insertion means 48 preferably comprises a capillary sheath not shown having at least one passage through which the fiber(s) and/or conductor(s) and any filler material, if needed, pass. By positioning the fiber(s) and/or the conductor(s) within the capillary sheath during the sealing operation, it is possible to prevent them from being damaged by the sealing operation. Preferably, the fiber(s) and/or conductor(s) to be inserted are positioned inside the capillary sheath during the tube forming operation as well. In a preferred manner of assembling the cable core 12, the tube 14 is formed about the capillary sheath. The capillary sheath and its use as well as the manner of inserting the fiber(s) and/or conductor(s) are more fully described in the aforementioned Ser. No. 497,535 application to Winter et al. which has been incorporated by reference. If desired, the protective sheath may be omitted if the tube seam 24 is not sealed during core assembly.

If the seam 24 has been sealed or if the tube 14 has been coated with a sealing or coating material such as solder, it is desirable to pass the tube 14 through a means for promoting rapid solidification of the sealing or coating material. In a preferred embodiment, the tube 30 is passed through either an air spray or a water quench station 31 to promote such solidification.

After the cable core 12 has been assembled, it may be passed through one or more surface preparation stations. The surface preparation stations may include a degreasing station 36 and/or means 38 for removing any excess material from the outer periphery of the tube 14. Degreasing station 35 is primarily intended to remove any flux, filler material and/or other contaminant from the outer tube surface. It may comprise any suitable degreasing apparatus known in the art. Preferably, it is one that uses a non-etching cleaning solution.

The excess material removing means 38 may comprise any suitable material removing device known in the art. Preferably, it comprises a shaving die not shown through which the cable core assembly 12 passes. A suitable die for removing any excess material is described in the Ser. No. 497,535 patent application to Winter et al. which has been incorporated by reference.

Normally, one or more external layers are fabricated about the cable core assembly 12. The type of external layer or layers fabricated depends upon the ultimate application of the cable. For example, if it is desired to have the tube 14 act as an electrical conductor, an electrical insulating or dielectric layer 50 may be fabricated about the tube 14. Where strength is of importance, a layer 52 of contrahelically wound filaments such as a layer of plastic filaments may be fabricated about the tube 14 and/or about any intermediate non-metallic layer. Where additional protection is required such as an outer protective layer to protect against fish bites in an undersea environment, a non-metallic protective layer 54 such as a layer of polyethylene may be fabricated about the tube 14 and/or any intermediate layer or layers. Therefore, it is not unusual in these circumstances to have a layer of plastic or other non-metallic material extruded or fabricated over the metal or metal alloy tube 14. Where the tube 14 is formed from copper or a copper alloy, an extruded layer may not bond well to the tube. If the adhesion between the tube and such an extruded layer is poor, the bond may ultimately fail and relative movement between the tube and the extruded layer may occur. This is undesirable because it reduces overall cable strength.

In accordance with the present invention, this problem is substantially eliminated by depositing in situ an adherent polymeric film coating 56 on the outer surface of the tube 14 prior to the fabrication of any external layer or layers. In a preferred embodiment, the polymeric film coating 56 is applied to the tube surface using a plasma deposition technique.

Figure 3:
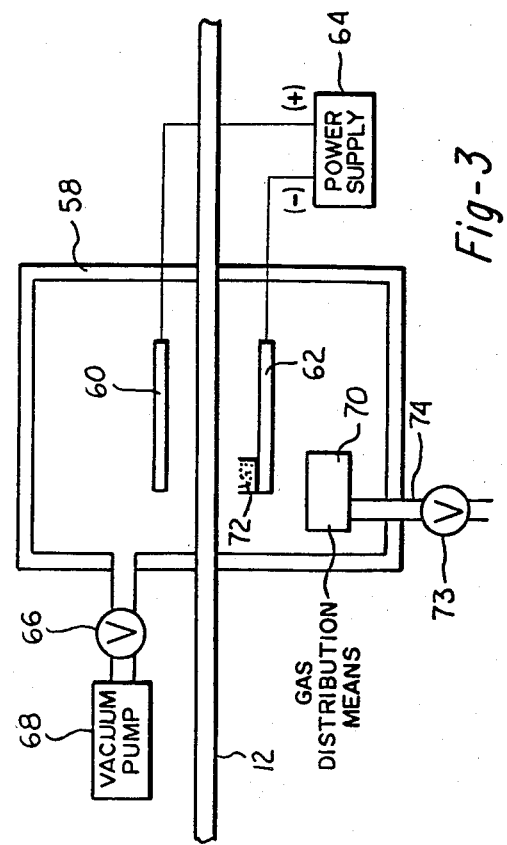
FIG. 3 is a schematic representation of the plasma deposition apparatus of FIG. 1.

Referring now to FIG. 3, an apparatus 40 for plasma depositing the adherent polymeric film coating onto the outer surface of tube 14 is illustrated. The apparatus 40 comprises an evacuable chamber 58 through which the core assembly 12 passes and in which the polymerization of the tube surface takes place. Two electrodes 60 and 62, generally an anode and a cathode, are located in the chamber 58. The electrodes 60 and 62 are both connected to an external power source 64 which may be either a conventional DC source or a conventional AC source. An AC source is preferred because films deposited from DC glow discharge systems are generally poor and difficult to reproduce. Preferably, the core assembly 12 passes between the electrodes 60 and 62.

The electrodes 60 and 62 can be a screen, coil or plate formed from any suitable electrically conductive material. Generally, the electrodes 60 and 62 are spaced from about 2" to about 6" apart. When an AC source is used, the electrodes could also be formed from a dielectric material. If desired, one of the electrodes could be omitted and the tube 14 could be electrically connected to the power source 64 as an anode or a cathode.

In using an AC power supply, current at a desired frequency and a desired power level is supplied to the electrodes. Both the frequency and the power level can be varied over a broad range as is well known to those skilled in the art.

The chamber 58 is connected through suitable ducting and valve means 66 to a vacuum pump 68. Vacuum pump 68 may comprise any suitable pump known in the art for evacuating the chamber 58 to a desired base pressure and for maintaining pressure within the chamber at a desired working pressure level. The ducting and valve means 66 may comprise any suitable ducting and valve(s) known in the art.

The chamber 58 also has means 70 for introducing a gas or a mixture of gases into the chamber interior. The gas distribution means 70 may comprise any suitable means known in the art such as a gas distributing ring or one or more conduits opening into the chamber interior. The gas distribution means 70 may be connected to one or more gas sources not shown through valve 73 and conduit 74. Valve 73 may comprise any suitable valve arrangement known in the art for regulating the mass and/or volume flow rate of each gas flowing into the chamber.

In a preferred manner of depositing an adherent polymeric film coating on the tube 14, a polar containing organic species source 72 is placed inside the chamber 58. The organic species source 72 may be placed in close proximity to or grounded on the electrode 62. The organic species may be in any desired physical state. In a preferred manner of performing the invention, the organic species in powder form is placed in a dish on the electrode 62.

The amount of organic species present in the chamber 58 should be sufficient to maintain a vapor pressure during plasma production substantially equal to a desired working pressure. It has been found to be desirable to have sufficient organic species material to maintain a vapor pressure of about 10 mtorr to about 100 mtorr, preferably from about 20 mtorr to about 30 mtorr.

The type of organic species used will of course depend upon the type of material from which the tube 14 to be coated is formed and the type of polymeric film coating desired. The organic species selected should be compatible with the material forming the tube 14 so as to form a stable compound. Where the tube 14 is formed from copper or a copper alloy, it has been found to be desirable to use an azole such as benzotriazole or toluenetriazole as the organic species. Other azoles including N-vinyl carbazole and acetyl carbazole and other chemicals with groups known to have a preference for combining with a copper material such as acetyl acetone and 9-acetyl anthracene may also be used.

While the cable core assembly 12 may be passed between the electrodes 60 and 62 in any suitable manner, it is believed to be desirable to have the core assembly as close as possible to the organic species source 72. It is believed that the closer the core assembly is to the organic species source, the better the adhesion properties of the coating. It appears that it is desirable to position the core assembly 12 from about 1 mm. to about 100 mm., preferably from about 1 mm. to about 30 mm., from the organic species source.

The plasma polymerization process is begun by evacuating the chamber 58 to a desired base pressure. A base pressure below about $10^{-5}$ torr is desirable. After the chamber 58 has had an opportunity to stabilize at a desired working pressure, a current at a desired frequency and a desired level of power is applied to the electrodes 60 and 62 by the external power supply 64. The current supplied to the electrodes is preferably at a frequency in the range of about 10 kilohertz to about 20 gigahertz, most preferably from about 1 megahertz to about 100 megahertz. The power level applied to the electrodes may be described in terms of power per electrode area (watts/inch$^2$) and/or power per contained plasma volume (watts/inch$^3$). As used herein, the term "contained plasma volume" is defined to be that volume between electrodes 60 and 62. The plasma polymerization process may be carried out using a level of power per electrode area in the range of about 2.45 watts/inch$^2$ to about 14.8 watts/inch$^2$ and/or a level of power per contained plasma volume in the range of about 0.44 watts/inch$^3$ to about 2.65 watts/inch$^3$. Preferably, the level of power per electrode area is in the range of about 4.9 watts/inch$^2$ to about 10 watts/inch$^2$ and/or the level of power per contained plasma volume in the range of about 0.88 watts/inch$^3$ to about 1.75 watts/inch$^3$.

The power and current supplied to the electrodes 60 and 62 cause a plasma to be created in the chamber 58. This initial plasma in turn causes heating of the electrode 62 and vaporization or volatilization of at least some of the powdered organic species. To maintain the vapor pressure in the chamber 58 at the desired working pressure level, the valve means 66 connected to the vacuum pump 68 may be adjusted.

After the vapor pressure of the organic species has stabilized at the desired working pressure level, at least some nitrogen, preferably in gaseous form, is introduced into the chamber 58 through the gas distribution means 70. In a preferred manner of performing the plasma polymerization process, both nitrogen and hydrogen gas are introduced simultaneously into the chamber 58 gas distribution means 70. Since the introduction of nitrogen and/or hydrogen tends to increase the total pressure within the chamber 58, the valve means 66 may have to be adjusted to reduce and/or maintain the total working pressure within the desired pressure range.

The gas supply means 70 should be regulated so that the total gas flow rate of nitrogen and/or hydrogen into the chamber 58 is within the range of about $10^{-3}$ standard cubic centimeters/liter/minute to about 10 standard cubic centimeters/liter/minute, preferably from about $10^{-1}$ standard cubic centimeters/liter/minute to about 1 standard cubic centimeter/liter/minute. If only nitrogen gas is being introduced, the upper limit of the preferred range may be raised to about 2 standard cubic centimeters/liter/minute. Where both nitrogen and hydrogen gas are being introduced into the chamber 58, the ratio of the flow rate of nitrogen to the flow rate of hydrogen may vary from about 0.1:1 to about 10:1, preferably from about 1:1 to about 3:1.

After the desired plasma has been created, the cable core assembly may be introduced into the chamber 58. Thereafter, the cable core assembly 12 should be exposed to the plasma of the organic species and the nitrogen and/or hydrogen for a time period sufficient to deposit the desired polymer film coating on the outer surface of the tube 14. Suitable exposure times may range from about 1 second to about 30 minutes.

It is desirable during the exposure period to maintain the temperature in the vicinity of the cable core assembly within a range from about room temperature to about 300° C. If needed, the chamber 58 may be provided with suitable heating means not shown and/or cooling means not shown. The heating means and/or the cooling means may comprise any suitable heating means and/or cooling means known in the art.

Using the plasma polymerization process described above, a relatively pinhole-free, adherent polymer film coating having a thickness of about 50 Å to about 10,000 Å can be deposited on the outer surface of the tube 14. This polymer film coating generally exhibits a polar character that is particularly useful in forming strong chemical bonds with non-metallic materials. By the term "polar character", it is meant that the film has a sort of preferred orientation that permits the creation of strong chemical bonds between the coated surface and a surrounding non-metallic material.

The above described one-step plasma polymerization treatment is more fully described in co-pending U.S. patent application Ser. No. 554,465, filed Nov. 22, 1983 to Haque et al., now U.S. Pat. No. 4,526,806, which is hereby incorporated by reference. In lieu of the one-step plasma treatment, the cable core assembly may be subjected to a three-step plasma treatment similar to that described in co-pending U.S. patent application Ser. No. 554,466, filed Nov. 22, 1983 to Haque et al., now U.S. Pat. No. 4,524,089, which is also hereby incorporated by reference. To perform the three-step plasma treatment, three chambers such as that shown in FIG. 3 would be provided. In the first chamber, the cable core assembly 12 would be subjected to an oxygen plasma. In the second chamber, the cable core assembly would be exposed to a plasma of a suitable monomer gas such as a hydrocarbon monomer. In the third chamber, the cable core assembly would be subjected to a second plasma of oxygen gas.

In performing this three-step treatment, each chamber would first be evacuated to a desired base pressure, preferably a pressure below about $10^{-5}$ torr. Thereafter, the appropriate gas would be introduced into the chamber through the gas distribution means 70 at a desired flow rate. For each treatment step, the flow rate should be in the range of about 0.5 standard cubic centimeters/minute to about 50 standard cubic centimeters/minute, preferably from about 5 standard cubic centimeters/minute to about 10 standard cubic centimeters/minute. As before, the plasma in each chamber is created by applying a current at a desired power level and frequency to the electrodes. The power level and frequency may be in the ranges previously described. Similarly, the working pressure level in each of the chambers may be maintained within the working pressure range previously described.

It is believed to be desirable to expose the cable core assembly 12 to each of the oxygen plasma treatments for a time period in the range of about 5 minutes to about 40 minutes, preferably from about 10 minutes to about 20 minutes. For the monomer plasma treatment, a suitable exposure time is believed to be in the range of about 0.5 minutes to about 10 minutes, preferably from about 2.5 minutes to about 5 minutes.

While from a commercial standpoint it appears that providing three separate chambers to perform the three-step plasma treatment would be the most appropriate manner for performing this treatment, the three-step treatment could also be performed using a single chamber. In using this single chamber approach, the core assembly 12 would be kept in the chamber while the chamber is evacuated back to the desired base pressure between each step.

By applying the polymeric film coating after the cable core assembly has been fabricated, several problems associated with prior art treatments are avoided. First, the danger of peeling or scratching the coating is minimized. Second, a fresh coating is always provided. Third, the polymeric film coatings deposited by the plasma polymerization processes described herein appear to exhibit better adhesion properties than non-plasma applied polymer coatings.

After the polymeric film coating 56 has been deposited on the outer surface of the tube 14, the cable core assembly 12 may be passed to the external layer fabrication means 42. Of course, the type and number of external layers depend upon the ultimate use of the communication cable 10. For example, where it is desired to use the tube 14 as an electrical conductor, a dielectric layer 50 may be fabricated about the tube 14 and the coating 56. The dielectric layer may be formed from any suitable dielectric material. Normally, a plastic material such as high density polyethylene is extruded about the tube. The dielectric layer may be extruded about the tube 14 using any suitable apparatus known in the art such as an extrusion die.

Where overall cable strength is of importance, a layer 52 of glass or plastic filaments or fibers may be fabricated about the tube 14 and/or the dielectric layer 50. This layer may be formed in any suitable manner using any suitable apparatus known in the art. For example, the layer may comprise plastic fibers, such as those sold under the trademark KEVLAR by DuPont Corporation, contrahelically wrapped about the tube 14 and/or the dielectric layer 50. Normally, after the fibers have been wrapped around the tube 14, a thermo-setting epoxy resin is applied to improve the strength of this layer. However, it is not uncommon for the fibers to separate from the epoxy resin during use and defeat the strengthening purpose of the epoxy resin. It is believed that it is possible using the plasma polymerization treatments previously described to deposit a suitable polymer on the fibers to bond them to one another. As it is formed, the polymer will bond the individual fibers together laterally by penetration into the fibrous mass and be driven into the fibrous mass by the electrostatic forces incidental to plasma deposition. By achieving better bonding between laterally adjacent fibers, the resistance of the layer 52 to penetration can be greatly improved and the problem of abrasive wear of adjacent fibers greatly mitigated. The apparatus and plasma polymerization techniques previously described could be used as part of the external layer fabrication apparatus to bond the fibers together.

If desired, the cable 10 may be provided with an outer covering 54 which serves as a barrier to water intrusion and defocuses external cutting or grating forces. Such an outer covering may be formed from any suitable material such as an elastomeric material. The outer covering 56 may be fabricated in any well-known manner by any conventional apparatus known in the art. For example, the outer covering may be extruded about the tube 14, the dielectric layer 50 and/or the layer 52. Polyurethane could be used as the material for the outer protective covering 54. After the external layer fabrication process has been completed, the cable 10 may be wound upon take-up reel 50.

While the communication cable fabrication process of the present invention has been illustrated as being an in-line technique, it is also possible to assemble the cable in a plurality of stages that are not in-line. However, if this latter approach is used, the polymeric film coating should be applied to the tube 14 just prior to the fabrication of the external layer or layers so that the attendant advantages can be retained.

Where the optical fiber(s) and/or the electrical conductor(s) are encased within a plastic or other non-metallic material and it is desirable to prevent relative movement between the tube and the fiber(s) and/or conductor(s), the surface of the strip 20 that forms the internal surface of the tube 14 may be pretreated to have an adherent polymeric film coating deposited thereon. This plasma polymerization pretreatment may be performed using an apparatus similar to that shown in FIG. 3 and the plasma polymerization processes described herein.

While the tube 14 may be found from any suitable metal or metal alloy, it is desirable for many applications to form it from a material having a conductivity in the range of about 25 to 102% IACS, a yield strength in the range of about 30 to about 90 ksi, a yield strain less than about 1%, and a diameter to thickness ratio of about 5:1 to about 25:1. While a number of metals and metal alloys possess this combination of strength, conductivity and diameter to thickness ratio, it is preferred to form the tube 14 from a copper alloy such as CDA copper alloy C15100. Copper alloys C63800 and C68800 may also be used.

The cable produced by the instant invention can be used in underground, aboveground and undersea communication applications. For example, it could be used to supply data support and power to a deep sea sensor. It could also be used for underground, aboveground and undersea telephone applications.

While the invention has been exemplified with respect to the use of a die for initially forming an open tube section from the strip 20, if desired, a roll forming approach could be employed to form the open tube section. The final forming of the open tube section into the tube, however, should be by die forming as described herein.

The cable core assembly 12 may contain any desired number of optical fibers 16 and/or electrical conductors 18. Any suitable optical fiber with or without a buffer material and/or any suitable electrical conductor known in the art may be used in the cable core assembly. Where a buffer material surrounding the optical fiber or fibers substantially occupies the area within the containment tube 14, it is not necessary to use a filler material.

While the invention has been described in the context of communication cables, certain aspects of the invention may be used to fabricate other structures such as mechanical cables and ropes in which metal and/or non-metallic fibers are used as strength members.

The U.S. patents and patent applications and the foreign patent publications set forth in this application are intended to be incorporated by reference herein.

It is apparent that there has been provided in accordance with this invention a novel plasma deposition application to communication cables which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A process for forming a cable to be used in communication applications, said process comprising:
   providing a tubular member formed from a metallic material;
   plasma depositing a polymeric film coating on an external surface of said tubular member; and encasing said tubular member and said polymeric coating in at least one layer of non-metallic material, whereby said plasma deposited polymeric coating improves the adhesion between said tubular member and said at least one non-metallic material layer.

2. The process of claim 1 wherein the step of providing a tubular member comprises:

providing a strip of metal or metal alloy;

providing at least one die; and pulling said strip through said at least one die to form said tubular member.

3. The process of claim 2 further comprising:

inserting at least one optical fiber into said tubular member.

4. The process of claim 2 further comprising:

inserting at least one electrical conductor into said tubular member.

5. The process of claim 1 wherein said plasma depositing step comprises:

forming a plasma of a monomer gas; and exposing said tubular member to said plasma for a period of time sufficient to deposit said polymeric film coating on said surface.

6. The process of claim 5 wherein said plasma depositing step further comprises:

exposing said tubular member to a plasma of oxygen gas prior to and after said tubular member being exposed to said monomer gas plasma.

7. The process of claim 1 wherein said plasma depositing step comprises:

forming a plasma of a polar containing organic species and at least one of nitrogen and hydrogen; and exposing said tubular member to said plasma for a period of time sufficient to deposit said polymeric film coating on said surface.

8. The process of claim 1 wherein said at least one layer encasing step includes:

surrounding said tubular member with a plurality of plastic filaments; and bonding said filaments together with a plasma deposited polymeric material, whereby said polymeric material reduces the abrasive wear caused by adjacent ones of said filaments and improves the penetration resistance of said cable.

9. An apparatus for forming a cable having a metallic tubular core member, said apparatus comprising:

means for plasma depositing in situ a polymeric film coating on an external surface of said core member; and means for encasing said core member and said polymeric coating in at least one layer of non-metallic material, whereby said plasma deposited polymeric film coating improves the adhesion between said core member and said at least one non-metallic layer.

10. The apparatus of claim 9 further comprising:

means for fabricating said metallic tubular core member from a strip of metal or metal alloy.

11. The apparatus of claim 10 wherein said fabricating means comprises:

at least one die; and means for pulling said strip through said at least one die to form said tubular core member.

12. The apparatus of claim 10 further comprising:

means for inserting at least one optical fiber into said core member.

13. The apparatus of claim 10 further comprising:

means for inserting at least one electrical conductor into said core member.

14. The apparatus of claim 9 wherein said plasma depositing means comprises:

means for forming and exposing said core member to a plasma of a monomer gas.

15. The apparatus of claim 14 wherein said plasma depositing means further comprises:

means for forming and exposing said core member to a plasma of oxygen gas prior to and after exposing said core member to said monomer gas plasma.

16. The apparatus of claim 9 wherein said plasma depositing means comprises:

means for forming and exposing said core member to a plasma of a polar containing organic species and at least one of nitrogen and hydrogen.

17. The apparatus of claim 9 wherein said encasing means comprises:

means for surrounding said core member with a plurality of plastic filaments; and means for plasma depositing in situ a polymeric material for bonding said filaments together to reduce the abrasive wear caused by adjacent ones of said filaments and to improve the penetration resistance of said cable.

* * * * *